United States Patent
Wildgoose et al.

(10) Patent No.: US 11,402,350 B2
(45) Date of Patent: Aug. 2, 2022

(54) POST-SEPARATION MOBILITY ANALYSER AND METHOD FOR DETERMINING ION COLLISION CROSS-SECTIONS

(71) Applicant: MICROMASS UK LIMITED, Wilmslow (GB)

(72) Inventors: Jason Lee Wildgoose, Stockport (GB); Kevin Giles, Stockport (GB)

(73) Assignee: Micromass UK Limited, Wilmslow (GB)

( * ) Notice: Subject to any disclaimer, the term of this patent is extended or adjusted under 35 U.S.C. 154(b) by 553 days.

(21) Appl. No.: 16/337,361

(22) PCT Filed: Sep. 27, 2017

(86) PCT No.: PCT/GB2017/052881
§ 371 (c)(1),
(2) Date: Mar. 27, 2019

(87) PCT Pub. No.: WO2018/060690
PCT Pub. Date: Apr. 5, 2018

(65) Prior Publication Data
US 2021/0293752 A1    Sep. 23, 2021

(30) Foreign Application Priority Data

Sep. 27, 2016 (GB) .................. 1616395

(51) Int. Cl.
*G01N 27/622* (2021.01)
*H01J 49/00* (2006.01)
*H01J 49/42* (2006.01)

(52) U.S. Cl.
CPC ........ *G01N 27/622* (2013.01); *H01J 49/0031* (2013.01); *H01J 49/4225* (2013.01)

(58) Field of Classification Search
CPC .... H01J 49/0031; H01J 49/42; H01J 49/4225; G01N 27/622
See application file for complete search history.

(56) References Cited

U.S. PATENT DOCUMENTS

| | | | |
|---|---|---|---|
| 8,507,852 B2* | 8/2013 | Makarov | G01N 27/622 250/281 |
| 10,388,499 B2* | 8/2019 | Giles | H01J 49/005 |

(Continued)

FOREIGN PATENT DOCUMENTS

| | | |
|---|---|---|
| CN | 101093211 A | 12/2007 |
| CN | 103364480 A | 10/2013 |

(Continued)

OTHER PUBLICATIONS

Search Report under Section 17(5) for United Kingdom Application No. GB1616395.8 dated Feb. 8, 2017, 3 pages.

(Continued)

*Primary Examiner* — Wyatt A Stoffa
(74) *Attorney, Agent, or Firm* — Goodwin Procter LLP (57) ABSTRACT

There is provided a method comprising separating a first population of ions according to a first physico-chemical property in a first separation device, and separating one or more groups of ions emerging from the first separation device in a drift tube and sampling each group of ions using the drift tube to determine the collision cross section of ions in each group of ions, wherein each group of ions corresponds to a range of the first physico-chemical property. The drift tube is configured such that multiple groups of ions in the first population of ions can be sampled by the drift tube in a single cycle of separation of the first separation device. The step of sampling each group of ions comprises determining the mobility of ions in each group of ions by measuring their drift time through the drift tube, and deter- (Continued)

mining the collision cross section of the ions in each group of ions using the determined mobility.

12 Claims, 1 Drawing Sheet

(56) References Cited

U.S. PATENT DOCUMENTS

| | | | | |
|---|---|---|---|---|
| 10,522,336 | B2* | 12/2019 | Green | H01J 49/0031 |
| 11,237,154 | B2* | 2/2022 | Astarita | B01D 15/08 |
| 2004/0031920 | A1* | 2/2004 | Giles | G01N 27/622 |
| | | | | 250/287 |
| 2008/0251712 | A1* | 10/2008 | Sanders | G01N 27/622 |
| | | | | 250/282 |
| 2009/0014641 | A1* | 1/2009 | Bateman | G01N 27/622 |
| | | | | 250/281 |
| 2011/0095175 | A1* | 4/2011 | Bateman | G01N 27/624 |
| | | | | 250/288 |
| 2012/0153140 | A1* | 6/2012 | Makarov | G01N 27/622 |
| | | | | 250/281 |
| 2013/0009053 | A1* | 1/2013 | Wu | G01N 27/622 |
| | | | | 250/288 |
| 2014/0027627 | A1* | 1/2014 | Hoyes | H01J 49/065 |
| | | | | 250/281 |
| 2015/0219598 | A1* | 8/2015 | Mordehai | G01N 27/622 |
| | | | | 250/282 |
| 2015/0340221 | A1* | 11/2015 | Benner | H01J 49/22 |
| | | | | 250/288 |
| 2017/0131238 | A1* | 5/2017 | Giles | H01J 49/0031 |

FOREIGN PATENT DOCUMENTS

| | | | |
|---|---|---|---|
| CN | 104170053 A | 11/2014 | |
| GB | 2529924 A | 3/2016 | |
| GB | 2530835 A | 4/2016 | |
| GB | 2534431 A | 7/2016 | |
| JP | 2007534126 A | 11/2007 | |
| JP | 2008513941 A | 5/2008 | |
| JP | 2015512515 A | 4/2015 | |
| WO | 2015136264 A1 | 9/2015 | |
| WO | WO-2015136264 A1 * | 9/2015 | H01J 49/004 |
| WO | 2015173577 A1 | 11/2015 | |
| WO | 2016027085 A1 | 2/2016 | |

OTHER PUBLICATIONS

International Search Report and Written Opinion for International Application No. PCT/GB2017/052881 dated Dec. 13, 2017, 15 pages.

* cited by examiner

POST-SEPARATION MOBILITY ANALYSER AND METHOD FOR DETERMINING ION COLLISION CROSS-SECTIONS

CROSS-REFERENCE TO RELATED APPLICATION

This application is a national phase filing claiming the benefit of and priority to International Patent Application No. PCT/GB2017/052881, filed on Sep. 27, 2017, which claims priority from and the benefit of United Kingdom patent application No. 1616395.8 filed on Sep. 27, 2016. The entire contents of these applications are incorporated herein by reference.

FIELD OF THE INVENTION

The present invention relates generally to mass spectrometers and methods of mass spectrometry, and in particular to ion mobility spectrometry and methods of separating ions according to ion mobility.

BACKGROUND

A key attribute of ion mobility separation is the capability to determine collision cross section ("CCS") values. Standard mobility separation devices involve the application of a constant or static DC voltage across the length of a drift tube, and this allows determination of collision cross-section values from first principles.

Other device can be used to measure collision cross section, and these include travelling wave ("T-Wave") mobility separators. However, in such devices collision cross-section values are not attainable from first principles, but may be derived or estimated through the use of appropriate mobility calibration compounds.

However, with other approaches, such as differential mobility separation ("DMS"), ion mobility and collision cross section data are not obtainable.

Whilst calibration remains a solution for obtaining collision cross section values in the case of travelling wave ion mobility separation, alternative and improved methods of determining collision cross sections directly is desired.

SUMMARY

In accordance with an aspect of the disclosure, there is provided a method comprising:

separating a first population of ions according to a first physico-chemical property in a first separation device; and separating one or more groups of ions emerging from said first separation device in a drift tube and sampling each group of ions using said drift tube to determine the collision cross section of ions in each group of ions, wherein each group of ions corresponds to a range, e.g., a reduced, limited or restricted range of said first physico-chemical property;

wherein said drift tube is configured such that multiple groups of ions in said first population of ions can be sampled by said drift tube in a single cycle of separation of said first separation device, and the step of sampling each group of ions comprises:

determining the mobility of ions in each group of ions by measuring their drift time through said drift tube; and determining the collision cross section of said ions in each group of ions using said determined mobility.

The technology disclosed herein is aimed at providing an alternative and improved (e.g., quicker and deterministic) method of measuring collision cross sections of ions that are emerging from a high resolution separation device. The drift tube can be provided to quickly determine the collision cross section of ions emerging from the first separation device before those ions are onwardly transmitted to other parts of a spectrometer.

The method as described herein also does not require the use of calibrants to measure collision cross section.

In some embodiments, the drift tube may operate at a fast cycle time relative to the first separation device. Cycle time (or cycle of separation) may be defined as the time taken for the slowest ion in a given population, group or cluster of ions to travel through, and exit, a separation device if all of the ions in the population, group or cluster of ions are introduced into the separation device at substantially the same time. The cycle time of the first separation device may be at least 10, 20, 30, 40, 50 or 100 times greater than the cycle time of the drift tube.

In other embodiments, the drift tube may be configured to separate successive groups of ions emerging from the first separation device in a continuous manner and/or at the same time.

One or more groups of ions may be pulsed into the drift tube (e.g., from the first separation device) whilst one or more preceding groups of ions, or at least some ions in one or more preceding groups of ions are still present (e.g., still being separated) in the drift tube. The drift tube may be configured to separate at least 2, 3, 4, 5 or 10 groups of ions at the same time.

In these embodiments there would be a reduced mobility range within the drift tube at any one time (due to pre-separation in the first separation device) and so 'overpulsing' of groups of ions into (i.e., multiple groups of ions being separated within) the drift tube is possible. In other words, more than one group of ions would be present in the drift tube. The pulsing period (i.e., the period of time between pulsing each group into the drift tube) would preferably be of the same or shorter timescale than the temporal width of the groups of ions emerging from the first separation device.

In all aspects and embodiments described herein, each group of ions may be sampled at multiple points across the range of values of the first physico-chemical property within that group of ions. For example, the physico-chemical property may be ion mobility, and multiple values of collision cross section may be determined for ions in each group of ions The step of determining the mobility of ions in each group of ions may comprise using an equation of the form:

$$K = \frac{L^2}{T \times V}$$

where K is the mobility of an ion travelling through the drift tube in a drift time T, and V is the voltage drop across the length L of the drift tube.

The step of determining the mobility of ions in each group of ions may comprise one or more of (i) applying a DC voltage gradient along the length of the drift tube, (ii) varying the DC voltage gradient across a range of different values, (iii) measuring an arrival time distribution of ion species travelling through the drift tube, and (iv) plotting a graph of drift time against voltage drop across the drift tube, for example using the above equation.

The mobility and/or collision cross section of ions may be determined directly from the line of best fit of this graph. In other words, the mobility and/or collision cross section may be determined from first principles, and without the use of calibrants, for example.

The drift tube may comprise a plurality of electrodes, and the method may further comprise applying a constant DC voltage to the plurality of electrodes to urge ions along the drift tube, for example along the length (e.g., the entire length) of the drift tube.

The first physico-chemical property may comprise ion mobility. Each group of ions may correspond to a mobility peak emerging from the first separation device. Each mobility peak may be sampled at multiple points such that multiple collision cross section values may be determined across each mobility peak.

Each group of ions may correspond to a range of said first physico-chemical property, for example if said first physico-chemical property is ion mobility or mass to charge ratio, then the range of said first physico-chemical property may be a range of ion mobilities or a range of mass to charge ratios, respectively.

The first separation device may comprise an ion mobility separator comprising a plurality of electrodes.

The method may further comprise applying one or more transient DC voltages or potentials to at least some of the electrodes of the first separation device in order to urge ions along the separation device. The one or more transient DC voltages or potentials may be swept, translated or sequentially applied along at least a portion of the axial length of the first separation device with a first velocity, so as to cause ions to be separated according to their ion mobility.

The first physico-chemical property may comprise mass to charge ratio and each group of ions may correspond to a range of mass to charge ratios emerging from the first separation device.

The first separation device may comprise a quadrupole or multipole mass filter.

One or more voltages may be applied to the drift tube such that a voltage gradient (e.g., a voltage drop), e.g., a DC voltage gradient exists or is present along the length of the drift tube. The voltage gradient across the drift tube may be less than 50 V, 30 V, 20 V or 10 V.

The drift tube and/or the electrodes of the drift tube may have a length that is less than 10 cm, 5 cm, 4 cm, 3 cm, 2 cm or 1 cm. The length of the drift tube may be at least 2, 3, 4, 5, 10, 20, 50 or 100 times shorter than the length of the first separation device. In any of these embodiments the drift tube may be arranged and adapted to separate ions according to the same physico-chemical property, e.g., ion mobility, as the first separation device.

The drift tube may follow immediately from the first separation device.

The determination of the collision cross section of the ions in each group of ions using the determined mobility may represent a nested acquisition of collision cross section within the timescale of the high resolution separator.

In accordance with an aspect of the disclosure, there is provided an apparatus comprising:

a first separation device arranged and configured to separate a first population of ions according to a first physico-chemical property;

a drift tube arranged and configured to separate one or more groups of ions emerging from said first separation device, and such that, in use, multiple groups of ions in said first population of ions can be sampled by said drift tube in a single cycle of separation of said first separation device, wherein each group of ions corresponds to a range of said first physico-chemical property; and a control system arranged and configured to sample each group of ions to determine the collision cross section of ions in each group of ions by:

(i) determining the mobility of ions in each group of ions by measuring their drift time through said drift tube; and (ii) determining the collision cross section of said ions in each group of ions using said determined mobility.

The apparatus may form part of a spectrometer, for example a mass and/or ion mobility spectrometer.

It will be appreciated that the present disclosure contemplates the use of a rapid, low resolution, linear field separator (in the form of a drift tube) following a first separation device (e.g., a travelling wave ion mobility separator) to allow direct determination of collision cross section values for groups of ions emerging from the first separation device.

The spectrometer may comprise an ion source selected from the group consisting of: (i) an Electrospray ionisation ("ESI") ion source; (ii) an Atmospheric Pressure Photo Ionisation ("APPI") ion source; (iii) an Atmospheric Pressure Chemical Ionisation ("APCI") ion source; (iv) a Matrix Assisted Laser Desorption Ionisation ("MALDI") ion source; (v) a Laser Desorption Ionisation ("LDI") ion source; (vi) an Atmospheric Pressure Ionisation ("API") ion source; (vii) a Desorption Ionisation on Silicon ("DIOS") ion source; (viii) an Electron Impact ("EI") ion source; (ix) a Chemical Ionisation ("CI") ion source; (x) a Field Ionisation ("FI") ion source; (xi) a Field Desorption ("FD") ion source; (xii) an Inductively Coupled Plasma ("ICP") ion source; (xiii) a Fast Atom Bombardment ("FAB") ion source; (xiv) a Liquid Secondary Ion Mass Spectrometry ("LSIMS") ion source; (xv) a Desorption Electrospray Ionisation ("DESI") ion source; (xvi) a Nickel-63 radioactive ion source; (xvii) an Atmospheric Pressure Matrix Assisted Laser Desorption Ionisation ion source; (xviii) a Thermospray ion source; (xix) an Atmospheric Sampling Glow Discharge Ionisation ("ASGDI") ion source; (xx) a Glow Discharge ("GD") ion source; (xxi) an Impactor ion source; (xxii) a Direct Analysis in Real Time ("DART") ion source; (xxiii) a Laserspray Ionisation ("LSI") ion source; (xxiv) a Sonicspray Ionisation ("SSI") ion source; (xxv) a Matrix Assisted Inlet Ionisation ("MAII") ion source; (xxvi) a Solvent Assisted Inlet Ionisation ("SAII") ion source; (xxvii) a Desorption Electrospray Ionisation ("DESI") ion source; (xxviii) a Laser Ablation Electrospray Ionisation ("LAESI") ion source; and (xxix) Surface Assisted Laser Desorption Ionisation ("SALDI").

The spectrometer may comprise one or more continuous or pulsed ion sources. The spectrometer may comprise one or more ion guides. The spectrometer may comprise one or more ion mobility separation devices and/or one or more Field Asymmetric Ion Mobility Spectrometer devices. The spectrometer may comprise one or more ion traps or one or more ion trapping regions.

The spectrometer may comprise one or more collision, fragmentation or reaction cells selected from the group consisting of: (i) a Collisional Induced Dissociation ("CID") fragmentation device; (ii) a Surface Induced Dissociation ("SID") fragmentation device; (iii) an Electron Transfer Dissociation ("ETD") fragmentation device; (iv) an Electron Capture Dissociation ("ECD") fragmentation device; (v) an Electron Collision or Impact Dissociation fragmentation device; (vi) a Photo Induced Dissociation ("PID") fragmentation device; (vii) a Laser Induced Dissociation fragmentation device; (viii) an infrared radiation induced dissociation device; (ix) an ultraviolet radiation induced dissociation device; (x) a nozzle-skimmer interface fragmentation device; (xi) an in-source fragmentation device; (xii) an in-source Collision Induced Dissociation fragmentation device; (xiii) a thermal or temperature source fragmentation device; (xiv) an electric field induced fragmentation device; (xv) a magnetic field induced fragmentation device; (xvi) an enzyme digestion or enzyme degradation fragmentation device; (xvii) an ion-ion reaction fragmentation device; (xviii) an ion-molecule reaction fragmentation device; (xix) an ion-atom reaction fragmentation device; (xx) an ion-metastable ion reaction fragmentation device; (xxi) an ion-metastable molecule reaction fragmentation device; (xxii) an ion-metastable atom reaction fragmentation device; (xxiii) an ion-ion reaction device for reacting ions to form adduct or product ions; (xxiv) an ion-molecule reaction device for reacting ions to form adduct or product ions; (xxv) an ion-atom reaction device for reacting ions to form adduct or product ions; (xxvi) an ion-metastable ion reaction device for reacting ions to form adduct or product ions; (xxvii) an ion-metastable molecule reaction device for reacting ions to form adduct or product ions; (xxviii) an ion-metastable atom reaction device for reacting ions to form adduct or product ions; and (xxix) an Electron Ionisation Dissociation ("EID") fragmentation device.

The spectrometer may comprise a mass analyser selected from the group consisting of: (i) a quadrupole mass analyser; (ii) a 2D or linear quadrupole mass analyser; (iii) a Paul or 3D quadrupole mass analyser; (iv) a Penning trap mass analyser; (v) an ion trap mass analyser; (vi) a magnetic sector mass analyser; (vii) Ion Cyclotron Resonance ("ICR") mass analyser; (viii) a Fourier Transform Ion Cyclotron Resonance ("FTICR") mass analyser; (ix) an electrostatic mass analyser arranged to generate an electrostatic field having a quadro-logarithmic potential distribution; (x) a Fourier Transform electrostatic mass analyser; (xi) a Fourier Transform mass analyser; (xii) a Time of Flight mass analyser; (xiii) an orthogonal acceleration Time of Flight mass analyser; and (xiv) a linear acceleration Time of Flight mass analyser.

The spectrometer may comprise one or more energy analysers or electrostatic energy analysers. The spectrometer may comprise one or more ion detectors.

The spectrometer may comprise one or more mass filters selected from the group consisting of: (i) a quadrupole mass filter; (ii) a 2D or linear quadrupole ion trap; (iii) a Paul or 3D quadrupole ion trap; (iv) a Penning ion trap; (v) an ion trap; (vi) a magnetic sector mass filter; (vii) a Time of Flight mass filter; and (viii) a Wen filter.

The spectrometer may comprise a device or ion gate for pulsing ions; and/or a device for converting a substantially continuous ion beam into a pulsed ion beam.

The spectrometer may comprise a C-trap and a mass analyser comprising an outer barrel-like electrode and a coaxial inner spindle-like electrode that form an electrostatic field with a quadro-logarithmic potential distribution, wherein in a first mode of operation ions are transmitted to the C-trap and are then injected into the mass analyser and wherein in a second mode of operation ions are transmitted to the C-trap and then to a collision cell or Electron Transfer Dissociation device wherein at least some ions are fragmented into fragment ions, and wherein the fragment ions are then transmitted to the C-trap before being injected into the mass analyser.

The spectrometer may comprise a stacked ring ion guide comprising a plurality of electrodes each having an aperture through which ions are transmitted in use and wherein the spacing of the electrodes increases along the length of the ion path, and wherein the apertures in the electrodes in an upstream section of the ion guide have a first diameter and wherein the apertures in the electrodes in a downstream section of the ion guide have a second diameter which is smaller than the first diameter, and wherein opposite phases of an AC or RF voltage are applied, in use, to successive electrodes.

The spectrometer may comprise a device arranged and adapted to supply an AC or RF voltage to the electrodes. The AC or RF voltage optionally has an amplitude selected from the group consisting of: (i) about <50 V peak to peak; (ii) about 50-100 V peak to peak; (iii) about 100-150 V peak to peak; (iv) about 150-200 V peak to peak; (v) about 200-250 V peak to peak; (vi) about 250-300 V peak to peak; (vii) about 300-350 V peak to peak; (viii) about 350-400 V peak to peak; (ix) about 400-450 V peak to peak; (x) about 450-500 V peak to peak; and (xi)>about 500 V peak to peak.

The AC or RF voltage may have a frequency selected from the group consisting of: (i)<about 100 kHz; (ii) about 100-200 kHz; (iii) about 200-300 kHz; (iv) about 300-400 kHz; (v) about 400-500 kHz; (vi) about 0.5-1.0 MHz; (vii) about 1.0-1.5 MHz; (viii) about 1.5-2.0 MHz; (ix) about 2.0-2.5 MHz; (x) about 2.5-3.0 MHz; (xi) about 3.0-3.5 MHz; (xii) about 3.5-4.0 MHz; (xiii) about 4.0-4.5 MHz; (xiv) about 4.5-5.0 MHz; (xv) about 5.0-5.5 MHz; (xvi) about 5.5-6.0 MHz; (xvii) about 6.0-6.5 MHz; (xviii) about 6.5-7.0 MHz; (xix) about 7.0-7.5 MHz; (xx) about 7.5-8.0 MHz; (xxi) about 8.0-8.5 MHz; (xxii) about 8.5-9.0 MHz; (xxiii) about 9.0-9.5 MHz; (xxiv) about 9.5-10.0 MHz; and (xxv)>about 10.0 MHz.

The spectrometer may comprise a chromatography or other separation device upstream of an ion source. The chromatography separation device may comprise a liquid chromatography or gas chromatography device. Alternatively, the separation device may comprise: (i) a Capillary Electrophoresis ("CE") separation device; (ii) a Capillary Electrochromatography ("CEC") separation device; (iii) a substantially rigid ceramic-based multilayer microfluidic substrate ("ceramic tile") separation device; or (iv) a supercritical fluid chromatography separation device.

The ion guide may be maintained at a pressure selected from the group consisting of: (i)<about 0.0001 mbar; (ii) about 0.0001-0.001 mbar; (iii) about 0.001-0.01 mbar; (iv) about 0.01-0.1 mbar; (v) about 0.1-1 mbar; (vi) about 1-10 mbar; (vii) about 10-100 mbar; (viii) about 100-1000 mbar; and (ix)>about 1000 mbar.

Analyte ions may be subjected to Electron Transfer Dissociation ("ETD") fragmentation in an Electron Transfer Dissociation fragmentation device. Analyte ions may be caused to interact with ETD reagent ions within an ion guide or fragmentation device. Optionally, in order to effect Electron Transfer Dissociation either: (a) analyte ions are fragmented or are induced to dissociate and form product or fragment ions upon interacting with reagent ions; and/or (b) electrons are transferred from one or more reagent anions or negatively charged ions to one or more multiply charged analyte cations or positively charged ions whereupon at least some of the multiply charged analyte cations or positively charged ions are induced to dissociate and form product or fragment ions; and/or (c) analyte ions are fragmented or are induced to dissociate and form product or fragment ions upon interacting with neutral reagent gas molecules or atoms or a non-ionic reagent gas; and/or (d) electrons are transferred from one or more neutral, non-ionic or uncharged basic gases or vapours to one or more multiply charged analyte cations or positively charged ions whereupon at least some of the multiply charged analyte cations or positively charged ions are induced to dissociate and form product or fragment ions; and/or (e) electrons are transferred from one or more neutral, non-ionic or uncharged superbase reagent gases or vapours to one or more multiply charged analyte cations or positively charged ions whereupon at least some of the multiply charge analyte cations or positively charged ions are induced to dissociate and form product or fragment ions; and/or (f) electrons are transferred from one or more neutral, non-ionic or uncharged alkali metal gases or vapours to one or more multiply charged analyte cations or positively charged ions whereupon at least some of the multiply charged analyte cations or positively charged ions are induced to dissociate and form product or fragment ions; and/or (g) electrons are transferred from one or more neutral, non-ionic or uncharged gases, vapours or atoms to one or more multiply charged analyte cations or positively charged ions whereupon at least some of the multiply charged analyte cations or positively charged ions are induced to dissociate and form product or fragment ions, wherein the one or more neutral, non-ionic or uncharged gases, vapours or atoms are selected from the group consisting of: (i) sodium vapour or atoms; (ii) lithium vapour or atoms; (iii) potassium vapour or atoms; (iv) rubidium vapour or atoms; (v) caesium vapour or atoms; (vi) francium vapour or atoms; (vii) $C_{60}$ vapour or atoms; and (viii) magnesium vapour or atoms.

The multiply charged analyte cations or positively charged ions may comprise peptides, polypeptides, proteins or biomolecules.

Optionally, in order to effect Electron Transfer Dissociation: (a) the reagent anions or negatively charged ions are derived from a polyaromatic hydrocarbon or a substituted polyaromatic hydrocarbon; and/or (b) the reagent anions or negatively charged ions are derived from the group consisting of: (i) anthracene; (ii) 9,10 diphenyl-anthracene; (iii) naphthalene; (iv) fluorine; (v) phenanthrene; (vi) pyrene; (vii) fluoranthene; (viii) chrysene; (ix) triphenylene; (x) perylene; (xi) acridine; (xii) 2,2' dipyridyl; (xiii) 2,2' biquinoline; (xiv) 9-anthracenecarbonitrile; (xv) dibenzothiophene; (xvi) 1,10'-phenanthroline; (xvii) 9' anthracenecarbonitrile; and (xviii) anthraquinone; and/or (c) the reagent ions or negatively charged ions comprise azobenzene anions or azobenzene radical anions.

The process of Electron Transfer Dissociation fragmentation may comprise interacting analyte ions with reagent ions, wherein the reagent ions comprise dicyanobenzene, 4-nitrotoluene or azulene.

A chromatography detector may be provided, wherein the chromatography detector comprises either: a destructive chromatography detector optionally selected from the group consisting of (i) a Flame Ionization Detector (FID); (ii) an aerosol-based detector or Nano Quantity Analyte Detector (NQAD); (iii) a Flame Photometric Detector (FPD); (iv) an Atomic-Emission Detector (AED); (v) a Nitrogen Phosphorus Detector (NPD); and (vi) an Evaporative Light Scattering Detector (ELSD); or a non-destructive chromatography detector optionally selected from the group consisting of: (i) a fixed or variable wavelength UV detector; (ii) a Thermal Conductivity Detector (TCD); (iii) a fluorescence detector; (iv) an Electron Capture Detector (ECD); (v) a conductivity monitor; (vi) a Photoionization Detector (PID); (vii) a Refractive Index Detector (RID); (viii) a radio flow detector; and (ix) a chiral detector.

The spectrometer may be operated in various modes of operation including a mass spectrometry ("MS") mode of operation; a tandem mass spectrometry ("MS/MS") mode of operation; a mode of operation in which parent or precursor ions are alternatively fragmented or reacted so as to produce fragment or product ions, and not fragmented or reacted or fragmented or reacted to a lesser degree; a Multiple Reaction Monitoring ("MRM") mode of operation; a Data Dependent Analysis ("DDA") mode of operation; a Data Independent Analysis ("DIA") mode of operation a Quantification mode of operation or an Ion Mobility Spectrometry ("IMS") mode of operation.

BRIEF DESCRIPTION OF THE DRAWINGS

Various embodiments will now be described, by way of example only, and with reference to the accompanying drawings in which.

DETAILED DESCRIPTION

Generally, the present disclosure involves using a drift tube to sample multiple groups of ions emerging from a high resolution separator, for example a travelling wave ion mobility separator, to allow determination of collision cross section values for the various ion species that are separated in the travelling wave ion mobility separator. This obviates the need to use a calibration standard to determine the collision cross section, which is necessary, for example, if a travelling wave ion mobility separator is used to determine the ion mobility.

In some embodiments, the drift tube may be configured to separate multiple groups of ions emerging from a first separation device at the same time. One or more subsequent groups of ions may be pulsed into a drift tube (e.g., from the first separation device) whilst one or more preceding groups of ions, or at least some ions in one or more preceding groups of ions are still present (e.g., still being separated) in the drift tube. The drift tube may be configured to separate at least 2, 3, 4, 5 or 10 groups of ions at the same time. In these embodiments there would be a reduced mobility range within the drift tube at any one time and so 'overpulsing' of groups of ions into (i.e., multiple groups of ions being separated within) the drift tube is possible. In other words, more than one group of ions would be present in the drift tube. The pulsing period (i.e., the period of time between pulsing each group into the drift tube) would optionally be of the same timescale as the frequency in which the groups emerge from the first separation device.

In other embodiments, the drift tube may operate at a fast cycle time relative to the first separation device. Cycle time (or cycle of separation) may be defined as the time taken for the slowest ion in a given population, group or cluster of ions to travel through, and exit a separation device if all of the ions in the population, group or cluster of ions are introduced into the separation device at substantially the same time. The cycle time of the first separation device may be at least 10, 20, 30, 40, 50 or 100 times greater than the cycle time of the drift tube.

In all the aspects and embodiments described herein, the low resolution separator may sample the groups of ions emerging from the high resolution separator in terms of collision cross section. In the case of the high resolution separator comprising a travelling wave ion mobility separator, for example, a mobility peak emerging from the high resolution separator may be sampled many times for collision cross section values.

A drift tube ion mobility separator may involve the use of one or more electrodes, along which a driving DC voltage gradient is applied. The DC voltage may be static and decrease in strength along the length of the drift tube, which causes ions have a high mobility to pass through the drift tube faster than ions having a low mobility.

The collision cross section of an ion species may be determined by varying the DC voltage gradient across a range of different values, measuring the arrival time distribution of the ion species, and plotting a graph of drift time against voltage drop across the drift tube. The ion mobility and collision cross section may be determined directly from the line of best fit of this graph.

Typical drift tube ion mobility separators can be relatively long and require a large voltage drop across the length of the drift tube to provide high resolution (the resolution of a DC drift tube is proportional to the square root of the voltage drop across the the drift tube).

The collision cross section of the ions travelling through the drift tube may be determined from the mobility of those ions. The mobility of ions travelling through the drift tube may be determined using the following equation:

$$K = \frac{L^2}{T \times V} \quad (1)$$

where K is the mobility of an ion travelling through the drift tube in a drift time T, and V is the voltage drop across the length L of the drift tube.

Once the mobility has been determined the collision cross section ($\Omega$) values of the ions can be determined using the Mason-Schamp equation:

$$K = \frac{3}{16} \frac{q}{N} \left( \frac{1}{m} + \frac{1}{M} \right)^{\frac{1}{2}} \left( \frac{2\pi}{T k_B} \right)^{\frac{1}{2}} \frac{1}{\Omega} \quad (2)$$

where q is the charge on the ion, N is the drift gas number density, m and M are the drift gas and ion mass respectively, T is the gas temperature and $k_B$ is Boltzmann's constant A travelling wave ion mobility separator may involve the use of a plurality of electrodes, each having an aperture through which ions travel in use, such that a different voltage can be applied to each electrode. Other travelling wave ion mobility separators may be used, in which a plurality of axial groups of electrodes are provided rather than a single electrode having an aperture. For example, each axial grouping of electrodes may be provided in the form of a ring divided into segments, such that different potentials may be applied to the different segments.

In a travelling wave device, transient DC voltages or potentials may be applied to the plurality of electrodes in order to urge ions along said separation device. The DC voltages or potentials may be swept, translated or sequentially applied along at least a portion of the axial length of the travelling wave device with a first velocity, which causes ions to be separated according to their ion mobility.

The collision cross section of ions emerging from a travelling wave device cannot be determined directly (i.e., from first principles) as described above in relation to the drift tube. This is because there is a non-uniform and time/position varying electric field, due to the application of transient DC voltages or potentials, and so the relationship between mobility and drift time is more complex than given in Equation 1.

To measure the collision cross section using a travelling wave ion mobility separator, the drift time of a plurality of calibrant ion species must be measured. A plot of the collision cross section (adjusted for charge state and reduced mass) of the calibrants (from a known library) against their drift time can be produced and a calibration curve determined, and from this the analyte collision cross sections may be determined using their measured drift times.

The technology of the present disclosure may obviate the need to use calibration compounds in order to determine the collision cross section of ions emerging from a travelling wave ion mobility separator, or other separation device. This is through the provision of a low resolution DC drift tube following the travelling wave ion mobility separator.

It has been recognised that a DC drift tube following such a separation device, and only being used for determination of collision cross section, does not need to have high resolution to allow confident determination of mobility values. Such values could be from fully separated components or from the pure 'temporal peak regions' of partially separated components.

The drift tube of the present disclosure can operate at a short cycle time relative to the high resolution separation device, such that multiple cycles can be completed by the drift tube in a single cycle of separation of the high resolution separation device. The drift tube of the present disclosure can be a short, low voltage, low resolution device.

For example, the drift tube may operate with a short enough cycle time and/or repetition rate, and/or fast enough separation time, so that the mobility peaks arriving from the upstream separator can be multiply sampled. In other words, a plurality of collision cross section values may be determined for each mobility peak emerging from the separation device (e.g., a travelling wave ion mobility separator). For example, at least 2, 3, 4, 5, 10 or 20 collision cross section values may be determined for each mobility peak emerging from the separation device.

In this manner, the technology of the present disclosure may allow nested acquisitions within the timescale of the high resolution separator. It is a consequence of this short timescale that the drift tube may be physically short. This has a knock-on effect in that the voltage drop across the drift tube can be small, e.g., to stay below a low field limit for accurate CCS measurements, which can have the further knock-on effect that the resolution may be relatively low.

Figure 1:
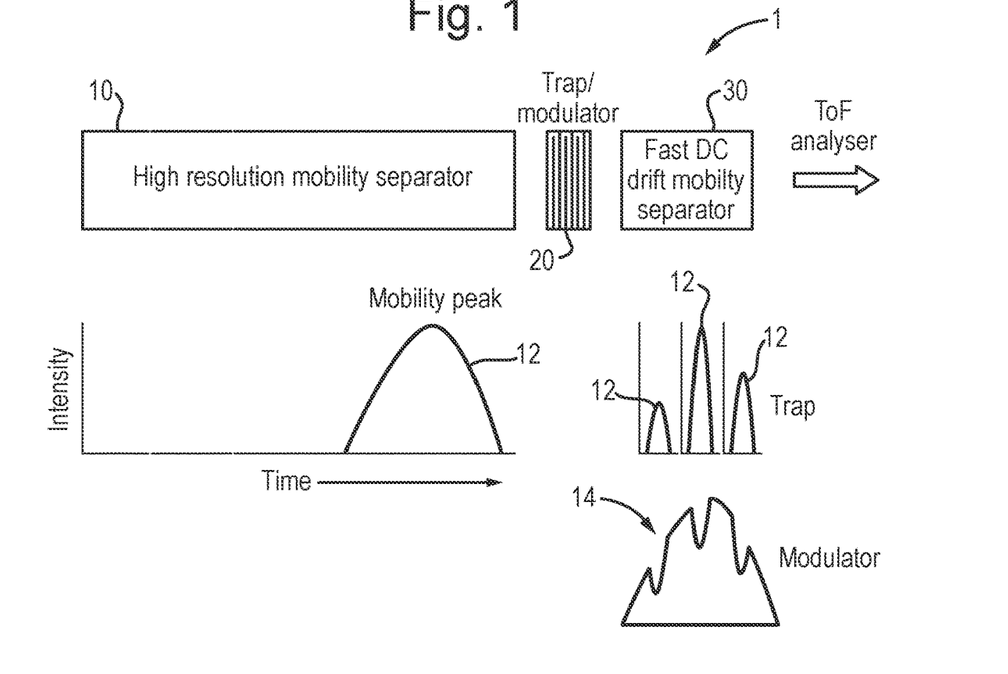
FIG. 1 shows an embodiment of the present disclosure.

FIG. 1 shows an apparatus 1 including a first separation device 10 which may be arranged and configured to separate ions according to their ion mobility.

The first separation device 10 may be a travelling wave ion mobility separator (e.g., as described above), and/or may comprise a plurality of electrodes, each having an aperture through which ions travel in use, such that a different voltage can be applied to each electrode. Instead of, or additionally to apertured electrodes, the travelling wave ion mobility separator 10 may comprise a plurality of axial groups of electrodes.

The first separation device 10 may be arranged and configured to apply one or more transient DC voltages or potentials to at least some of the electrodes in order to urge ions along said separation device. The one or more transient DC voltages or potentials may be swept, translated or sequentially applied along at least a portion of the axial length of the first separation device 10 with a first velocity, so as to cause ions to be separated according to their ion mobility.

The first separation device 10 may be operated at a relatively high resolution, for example in order to cause ions travelling through the first separation device 10 to separate into distinct groups (e.g., mobility peaks 12) as shown schematically in FIG. 1. As discussed above, it is not generally possible to analyse these peaks using the raw data to obtain values of collision cross section for the ions contained within the mobility peak, without measuring the drift time of a plurality of calibrants.

The apparatus 1 may further comprise an ion trap 20, which may be arranged and configured to keep the mobility peaks 12 emerging from the first separation device 10 separate. In alternative embodiments, the ion trap 20 may be replaced by a modulation device, which could be arranged and configured to modulate the mobility peaks 12 emerging from the first separation device 10 so that they form a modulated group of ions 14. The modulation of the mobility peaks 12 may be recorded and can be used to demodulate the peaks at a later stage, or otherwise extract information from the modulated group of ions 14. For example, the intensity of the ion signal for each group of ions 12 could be perturbed, and the transit time (drift time) for each perturbation could be recorded, and then optionally used for demodulation.

The perturbation could be imposed through application of a transient DC potential to a lens element in the ion trap 20, which could be arranged and configured to momentarily attenuate or block an ion beam passing through the ion trap 20, which could lead to partial or full extinction of the signal. The time between the applied perturbation and the recorded arrival of the perturbed signal at the detection system may then be used to determine mobility values. The perturbation can be such that no ions are lost, e.g., if the transient DC potential is applied in a region where RF confinement is present, or (less favourably) such that ions are lost, for example due to a lack of RF ion confinement or through use of a shutter grid to cut the signal.

The ion trap 20 may be replaced with a transport device that inherently modulates the ion beam, such as a travelling wave ion guide which may be arranged and configured to keep groups of ions emerging from the first separation device 10 in a separate potential well that is transported along the length of the transport device.

In accordance with the disclosure, a drift tube 30 is provided downstream of the first separation device 10 and ion trap 20 (if provided). The drift tube 30 may comprise a plurality of electrodes, and a static, driving DC voltage gradient may be applied to the plurality of electrodes. As discussed above, the DC voltage will decrease in strength along the length of the drift tube 30. In this manner, ions having a high mobility may pass through the drift tube 30 faster than ions having a low mobility.

The drift tube 30 may operate at a relatively low resolution (compared to the first separation device 10) due to the fast cycle time relative to the first separation device 10. In various embodiments the drift tube 30 may be shorter. For example, the axial length of the drift tube 30 may be less than 50%, 40%, 30%, 20% or 10% of the axial length of the first separation device 10.

Alternatively, or additionally the separation time of the drift tube 30 may be lower than that of the first separation device 10. For example, the separation time of the drift tube 30 may be less than 50%, 40%, 30%, 20% or 10% of the separation time of the first separation device 10.

Alternatively, or additionally the repetition rate of the drift tube 30 may be higher than that of the first separation device 10. For example, the repetition rate of the drift tube 30 may be at least 3, 4, 5, 10 or 20 times greater than the repetition rate of the first separation device 10.

In operation, ions entering the first separation device 10 may be separated according to a first physico-chemical property, such as ion mobility. The ions travelling through the first separation device 10 may be separated into groups of ions, and each group may be passed to the ion trap 20 and optionally kept separate therein (or modulated as described above).

Each group of ions may comprise ions having a value or range of values of the first physico-chemical property. For example, in the case of the first separation device 10 separating ions according to their ion mobility, each group of ions may comprise ions having an ion mobility within a first range, and/or may correspond to a mobility peak 12 as shown in FIG. 1.

The groups of ions may then be sampled using the drift tube 30. To do this the groups of ions may be transferred into the drift tube 30. The groups of ions could be transferred sequentially, where the groups of ions are kept separate in the upstream ion trap 20, or the groups of ions could be modulated and transferred as part of a modulated group of ions 14 as discussed above.

As the separation time of the drift tube 30 is relatively fast, each group of ions may be sampled at multiple points across the range of values of the first physico-chemical property. For example, the drift tube 30 may produce multiple sample points (and hence values for the collision cross section) across each mobility peak 12 exiting the first separation device 10. These values can be used to provide multiple measurements for averaging the mobility peak 12, and/or be used to give an indication of the purity of the mobility peak 12. For example, the variance in the collision cross section values across each mobility peak could be determined.

Advantageously, the drift tube 30 may be located within the same gas chamber as the first separation device 10. In embodiments in which the first separation device 10 comprises a travelling wave ion mobility separator, this can be advantageous since the drift gas can be the same for both devices. In other embodiments it may be advantageous to have the drift tube 30 as a separate gas chamber to the first separation device 10, for example if different gases were required for each device. In various embodiments, different separating media (e.g., drift gases) may be used in first separation device 10 and the drift tube 30.

The first separation device 10 and the drift tube 30 may form part of the same ion optical assembly. For example, the first separation device 10 and the drift tube 30 may be located within the same chamber (e.g., gas chamber). In embodiments where both devices comprise stacked ring electrodes (i.e., electrodes having apertures through which ions travel in use), the devices may form part of the same stack of electrodes.

The groups of ions that are passed through the drift tube 30 can be onwardly transmitted to a time of flight mass analyser. The collision cross section of ions within each group may be sampled as described above and determined directly, i.e., without the use of a calibrant.

The broadest aspects of this disclosure can also provide benefits over the use of a high resolution drift tube (which would typically be used as a stand-alone device). Using a separation device, in particular a travelling wave ion mobility separator, upstream of the drift tube leads to improved flexibility and control over the separation of ions prior to their introduction into the drift tube. Furthermore, high resolution drift tubes typically require a large voltage drop, which is not required when using the low resolution drift tube described herein (e.g., drift tube 30 as described above and in relation to FIG. 1).

Typically, travelling wave devices and drift tubes operating under similar conditions will operate on similar timescales and have similar resolutions, and it would not be possible to use the drift tube to provide multiple CCS measurements across a mobility peak.

For example, a 1 m long travelling wave separation device with a temporal resolution of 40, and a mobility peak at 40 ms drift time may have a FWHM peak width of about 1 ms. A 1 m long drift tube operating at 10 V/cm (1000 V drop across cell) may have a temporal resolution of about 60 for a singly charged ion at 298 K. The drift time for an ion having a collision cross section of 230 $Å^2$, with a drift gas (e.g., $N_2$) having a pressure of 2 mb might be around 20-25 ms.

In these conditions, therefore, the long drift tube could not be directly nested with the travelling wave separation device.

To achieve multiple points across the 1 ms wide mobility peak emerging from the travelling wave separation device, the length of the drift tube can be reduced in accordance with the disclosure. For a drift time of 0.5 ms, the drift tube could be about 2 cm long, for example. Maintaining the 10 V/cm field would require only a 20 V drop across the length of the shorter drift tube, giving a temporal resolution of about 8.

Parameters other than length may be altered in order to reduce the resolution of the drift tube, in accordance with the disclosure. For example, the drift gas pressure and/or electric field could be varied to alter the drift time. However, limitations may apply in ensuring that the drift tube separation remains within the low field limit, e.g., to ensure that there is no significant heating of the ions.

In various modes of operation, ions may be caused to fragment in the first separation device 10 and/or the drift tube 30. The groups of ions emerging from the first separation device 10 may alternatively be caused to undergo fragmentation between the first separation device 10 and the drift tube 30.

Figure 2:
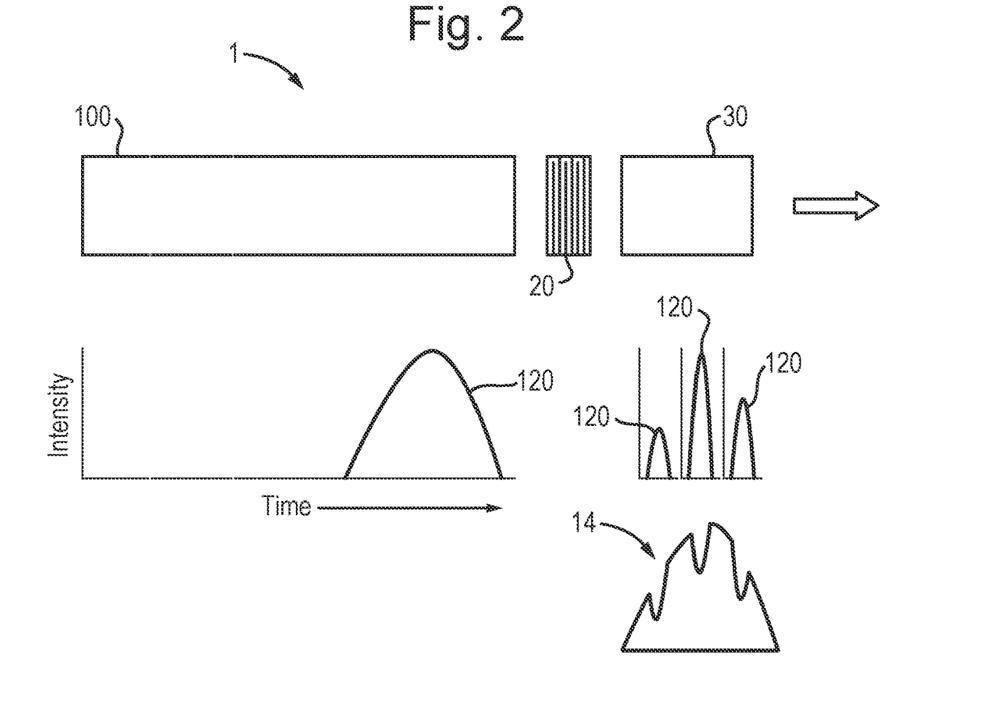
FIG. 2 shows another embodiment of the present disclosure.

In various embodiments the first separation device may comprise a quadrupole mass analyser 100, as shown in FIG. 2, which may be arranged and adapted to separate ions according to their mass to charge ratio. In these embodiments, a first population of ions may be separated according to mass to charge ratio in a quadrupole mass filter 100, and groups of ions 120 emerging from the quadrupole mass filter 100 may be separated in the drift tube 30, wherein the drift tube 30 operates at a fast cycle time relative to the transmission cycle of the quadrupole mass filter 100, such that the mobility and collision cross section of ions within each group of ions 120 can be determined can be sampled, each group of ions 120 having a particular range of mass to charge ratios. The remaining objects of this embodiment, such as the trap/modulator 20 and drift tube 30 may be the same as described above in respect of FIG. 1.

In various embodiments, the first separation device 10 may be provided in the form of one or more separation devices that may be arranged and configured to separate ions according to one or more physico-chemical properties and ion mobility. In these embodiments ion mobility and/or collision cross section may be determined using the drift tube and the determined ion mobility and/or collision cross section may be used to calculate or measure the one or more physico-chemical properties.

For example, a separation device in the form of a travelling wave separation device, wherein ions may be driven in pseudo-potential wells may separate ions according to both mass to charge ratio and ion mobility. The mobility of ions eluting from such a separation device may be determined by measuring their drift time through the drift tube 30, and then the mass to charge ratio of these ions may be determined using the determined mobility.

In various embodiments, the first separation device 10 may be cyclic, for example a cyclic ion mobility separation device. In these embodiments the highest resolution of the cyclic device can be achieved when ions have undergone multiple passes of the device. In these situations, it is likely that ions of significantly different mobilities may overlap as higher mobility ions catch lower mobility ions as they cycle around the device. In these embodiments the drift tube 30 may be located downstream of the cyclic device, so that the overlapping ions of different mobilities can be separated in the drift tube 30. At the same time the collision cross section of ions may be determined in the manner discussed above.

Although the present invention has been described with reference to preferred embodiments, it will be understood by those skilled in the art that various changes in form and detail may be made without departing from the scope of the invention as set forth in the accompanying claims.

The invention claimed is:

1. A method comprising:
separating a first population of ions according to a first physico-chemical property in a first separation device; and
separating one or more groups of ions emerging from said first separation device in a drift tube and sampling each group of ions using said drift tube to determine the collision cross section of ions in each group of ions, wherein each group of ions corresponds to a range of said first physico-chemical property;
wherein said drift tube is configured such that multiple groups of ions in said first population of ions can be sampled by said drift tube in a single cycle of separation of said first separation device, and the step of sampling each group of ions comprises:
determining the mobility of ions in each group of ions by measuring their drift time through said drift tube;
determining the collision cross section of said ions in each group of ions using said determined mobility; and
wherein said first physico-chemical property comprises ion mobility and each group of ions corresponds to a mobility peak emerging from said first separation device, and each mobility peak is sampled at multiple points such that multiple collision cross section values are determined across each mobility peak.

2. A method as claimed in claim 1, wherein said drift tube operates at a fast cycle time relative to said first separation device, wherein cycle time is defined as the time taken for the slowest ion in a given population, group or cluster of ions to travel through, and exit a separation device if all of the ions in said population, group or cluster of ions are introduced into the separation device at substantially the same time.

3. A method as claimed in claim 1, wherein said drift tube is configured to separate multiple groups of ions emerging from said first separation device at the same time.

4. A method as claimed claim 1, wherein each group of ions is sampled at multiple points across the range of values of the first physico-chemical property within that group of ions.

5. A method as claimed claim 1, wherein said drift tube comprises a plurality of electrodes, and said method further comprises applying a constant DC voltage gradient to said plurality of electrodes to urge ions along said drift tube.

6. A method as claimed in claim 5, wherein said first separation device comprises an ion mobility separator comprising a plurality of electrodes.

7. A method as claimed in claim 6, further comprising applying one or more transient DC voltages or potentials to at least some of said electrodes of said first separation device in order to urge ions along said separation device.

8. A method as claimed in claim 7, wherein said one or more transient DC voltages or potentials are swept, translated or sequentially applied along at least a portion of the axial length of said first separation device with a first velocity, so as to cause ions to be separated according to their ion mobility.

9. A method as claimed in claim 1, wherein a voltage drop across said drift tube is less than 50 V, 30 V, 20 V or 10 V.

10. A method as claimed in claim 1, wherein a length of said drift tube is less than 10 cm, 5 cm, 4 cm, 3 cm, 2 cm or 1 cm.

11. An apparatus comprising:
a first separation device arranged and configured to separate a first population of ions according to a first physico-chemical property;
a drift tube arranged and configured to separate one or more groups of ions emerging from said first separation device, and such that, in use, multiple groups of ions in said first population of ions can be sampled by said drift tube in a single cycle of separation of said first separation device, wherein each group of ions corresponds to a range of said first physico-chemical property; and
a control system arranged and configured to sample each group of ions to determine the collision cross section of ions in each group of ions by:
(i) determining the mobility of ions in each group of ions by measuring their drift time through said drift tube;
(ii) determining the collision cross section of said ions in each group of ions using said determined mobility; and
wherein said first physico-chemical property comprises ion mobility and each group of ions corresponds to a mobility peak emerging from said first separation device, and each mobility peak is sampled at multiple points such that multiple collision cross section values are determined across each mobility peak.

12. An apparatus comprising:
a first separation device arranged and configured to separate a first population of ions according to ion mobility;
a drift tube arranged and configured to separate one or more groups of ions emerging from said first separation device, and such that, in use, multiple groups of ions in said first population of ions can be sampled by said drift tube in a single cycle of separation of said first separation device, wherein each group of ions has a range of ion mobilities; and
a control system arranged and configured to sample each group of ions using said drift tube to determine the collision cross section of ions in each group of ions by:
(i) determining the mobility of ions in each group of ions by measuring their drift time through said drift tube; and
(ii) determining the collision cross section of said ions in each group of ions using said determined mobility;
wherein each of the first separation device and the drift tube has a cycle time that is defined as the time taken for the slowest ion in a given population or group of ions to travel through and exit the first separation device or drift tube if all of the ions in said population or group of ions are introduced into the first separation device or drift tube at substantially the same time; and
wherein the cycle time of said first separation device is at least 10 times greater than the cycle time of said drift tube.

* * * * *